I. SHAFER.
NUT LOCK.
APPLICATION FILED SEPT. 23, 1909.

968,991.

Patented Aug. 30, 1910.

WITNESSES
Samuel E. Wade
C. E. T____

INVENTOR
IRA SHAFER
BY Munn&Co.
ATTORNEYS

UNITED STATES PATENT OFFICE.

IRA SHAFER, OF SAN DIEGO, CALIFORNIA.

NUT-LOCK.

968,991.  Specification of Letters Patent.  Patented Aug. 30, 1910.

Application filed September 23, 1909. Serial No. 519,128.

*To all whom it may concern:*

Be it known that I, IRA SHAFER, a citizen of the United States, and a resident of San Diego, in the county of San Diego and State of California, have invented certain new and useful Improvements in Nut-Locks, of which the following is a specification.

My invention is an improvement in nut locks and consists in certain novel constructions and combinations of parts, hereinafter described and claimed.

The object of the invention is to provide a device of the character specified, that may be cheaply made, easily applied, and that will firmly lock the nut in place, and which will be fixed in place by the turning on of the nut.

Figure 1:
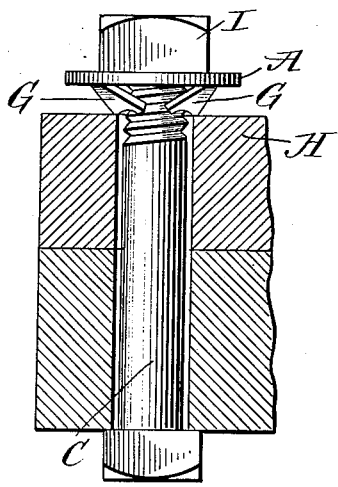
Figure 2:
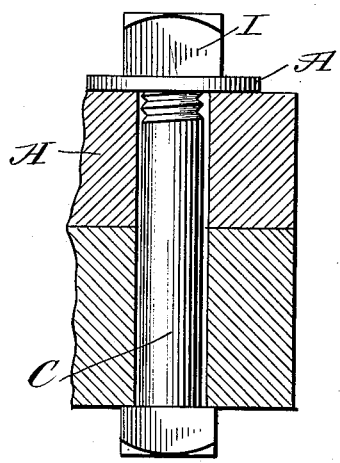
Figure 4:
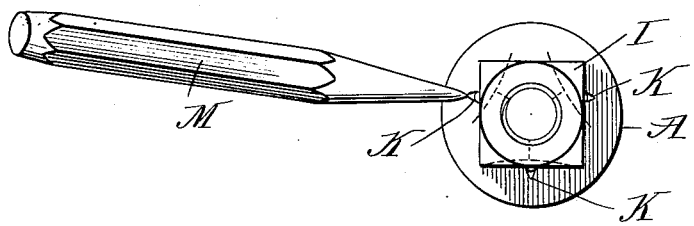
Figure 3:
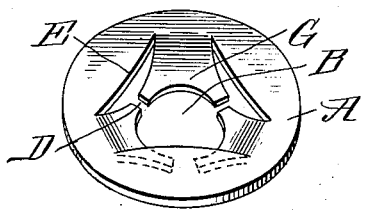

Referring to the drawings forming a part hereof—Figure 1 is a longitudinal section of a bolt and nut with the lock in place before locking. Fig. 2 is a similar view of the lock in place. Fig. 3 is a perspective view of the lock, and Fig. 4 shows the method of locking the nut to the lock.

The embodiment of the invention shown consists of a washer A, of any desired exterior shape and shown as circular, provided at its center with an opening B for receiving the bolt C. The opening B is of somewhat less diameter than the diameter of the bolt as for instance with a half inch bolt, the opening of the washer would be 7/16 inch in diameter. Radial cuts D lead from the central opening, and a transverse cut E is provided at the end of each of the radial cuts, and the radial and transverse cuts form tongues G in the metal as clearly shown in Fig. 3.

Before the washer is applied to the bolt, the tongues are bent laterally, all in the same direction, as shown in Fig. 1, to permit the washer to be placed on the bolt. The free ends of the tongues G rest against the face of the article H, through which the bolt passes, and the nut I is turned on the bolt, until the washer is flattened as shown in Fig. 2. It will be evident that the tongues G will cut and bruise the threads, so that it will be impossible to turn the washer, without stripping the threads. The washer may then be locked to the nut by striking up lugs K on the surface of the washer, the lugs engaging the faces of the nut, to prevent rotation of the same without rotating the washer. This may be done by a punch M as shown in Fig. 4. It will be evident that when so locked the nut cannot be removed without violence. It cannot turn without the washer, and the washer cannot turn without stripping the threads.

Ordinary washers are made use of, the washer thus fulfilling two functions that of a washer and also that of a lock, and the cost of the lock will be but slightly greater than that of the washer. It will also be evident that the shape of the washer or of the nut is entirely immaterial, and that the washer may be locked to the nut in any other manner if desired.

The radial slots are arranged at angles of 120° with respect to each other and the transverse slots are provided in order that the tongues may be more easily bent. It will be understood, however, that more or less tongues may be used, and they may be formed in any other manner.

The essential feature of the invention is the laterally bent tongues for gripping the bolt and the opening of smaller size than the bolt.

I claim:—

1. The combination with the bolt and the nut, of a washer having an opening for receiving the bolt, and of less diameter than the bolt, said washer being slotted radially from the opening at spaced intervals, and having a slot transverse to the radial slot at the outer end thereof to form tongues between the radial slots, said tongues being bent away from the nut for the purpose specified and having their free edges concave to fit the bolt and means in connection with the washer for engaging the nut to prevent rotation thereof with respect to the washer.

2. A nut locking washer having an opening for the passage of the bolt and slotted radially from the opening at spaced intervals and having a slot transverse to the radial slot at the other end thereof, whereby to form tongues between the radial slots, said tongues being bent out of the plane of the body of the washer and having their free edges adapted for engagement with the bolt, substantially as set forth.

IRA SHAFER.

Witnesses:
J. L. HARRIS,
D. E. ARTLEY.